US006941432B2

(12) United States Patent
Ronström

(10) Patent No.: US 6,941,432 B2
(45) Date of Patent: Sep. 6, 2005

(54) CACHING OF OBJECTS IN DISK-BASED DATABASES

(75) Inventor: Ulf Mikael Ronström, Hägersten (SE)

(73) Assignee: My SQL AB, Uppsala (SE)

( * ) Notice: Subject to any disclaimer, the term of this patent is extended or adjusted under 35 U.S.C. 154(b) by 403 days.

(21) Appl. No.: 09/741,122

(22) Filed: Dec. 19, 2000

(65) Prior Publication Data

US 2001/0013087 A1 Aug. 9, 2001

(30) Foreign Application Priority Data

Dec. 20, 1999 (DE) .......................................... 199 61 499

(51) Int. Cl.[7] .............................................. G06F 12/00
(52) U.S. Cl. ...................... 711/165; 711/118; 711/117; 711/133
(58) Field of Search ................................ 711/118, 165, 711/133, 117

(56) References Cited

U.S. PATENT DOCUMENTS

| | | | |
|---|---|---|---|
| 5,752,261 A | 5/1998 | Cochcroft, Jr. ............. | 711/133 |
| 6,324,620 B1 * | 11/2001 | Christenson et al. ....... | 711/112 |
| 6,330,556 B1 * | 12/2001 | Chilimbi et al. ............... | 707/2 |
| 6,385,697 B1 * | 5/2002 | Miyazaki .................... | 711/128 |
| 2001/0049818 A1 * | 12/2001 | Banerjia et al. ............... | 717/9 |

OTHER PUBLICATIONS

*Buffer Management Algorithms for Relational Database Management Systems* by M.E.C. Hull, F.F. Cai and D.A. Bell, Butterworth & Co. (Publishers) Ltd., 1988; pp. 66–80.

Voruganti, Kaladhar et al. "An Adaptive Hybrid Server Architecture for Client Caching Object DBMSs". Proceedings of the 25th VLDB Conference Edinburgh, Scotland, 1999. pp. 150–161.

* cited by examiner

*Primary Examiner*—Reginald G. Bragdon
(74) *Attorney, Agent, or Firm*—Whiteford, Taylor & Preston; Jeffrey C. Maynard

(57) ABSTRACT

A data processing device (DPD) comprises a main memory (MM) and a processing means (PM). Data from a data base system (DBS) is stored as pages in the main memory (MM). During processing of the individual objects (OB) of the pages (P) the access frequency to each object (OB) stored in the main memory (MM) is determined. Objects having similar access frequencies are collected in the same data storage section of the main memory (MM). In particular, data objects (OB) can be moved to higher order data storage sections to which a higher access frequency range has been assigned. Thus, data which is more frequently used by the processing means (PM) stays in the main memory (MM) longer and data objects which are not so frequently used are transferred back to the data base or are overwritten earlier.

24 Claims, 7 Drawing Sheets

Main memory database

User requests access to data belonging to "c_ID1"

CACHING OF OBJECTS IN DISK-BASED DATABASES

FIELD OF THE INVENTION

The present invention relates to a method and a data-processing device for reading data from a primary memory device and for storing said data in a secondary memory device for a read/write access by a processing means. The data in said primary memory device is organized in a plurality of data blocks each consisting of one or more data objects. The invention also relates to a data base system comprising as a primary memory device a disc memory including the database and a data processing device for processing, i.e. writing/reading and updating, individual data objects of said database.

In particular the invention addresses the problem of how memory space in the secondary memory can be used efficiently if a great plurality of data objects need to be stored temporarily in the secondary memory device.

BACKGROUND OF THE INVENTION

FIG. 1—1 shows a typical database system DBS comprising a primary memory D, e.g. a primary disc memory D, and a data processing device DPD. In the primary memory D data of a database DB is stored as a plurality of data blocks p00, p01, . . . p32. Typically the individual data blocks p are called pages of the database DB, i.e. the date in the primary memory device D is organized as a plurality of pages P. As is indicated in FIG. 1—1 , each datablock or data page P consists of one or more data objects OB. As is shown for the datablock P02, P32, each of these pages comprises a plurality of N and M of data objects OB02-1 . . . OB02-N, OB32-1 . . . OB32-M.

The data processing device DPD comprises as the second memory device MM a main memory MM, e.g. a work memory in a computer, and a processing means PM, e.g. a central processing unit of a computer. Furthermore, the data processing device DPD can comprise a socalled hash-table HT for determining the addresses in the secondary memory device MM. The usage of the hash-table HT is explained with further details below.

As shown in FIG. 1—1 the main memory MM comprises at least a page cache memory section PCS which is used as the traditional solution for caching objects in databases. Additionally the main memory can comprise a work memory or resident data memory section RDS in which data objects can also be stored. Where the page cache memory section PCS is arranged depends on the data processing device configuration. For example, the page memory PCS can also be provided within the processing means PM.

The usage of a page cache memory PCS is well-known in computer technology. Basically, instructions and data may be stored in a cache memory and if such instructions and data in the cache memory are accessed repeatedly within a short period of time, as often happens with program loops in the processing means PM, then program execution, i.e. the read/write access will be speeded up. The cache can normally only hold small parts of the executing instructions or data. When the cache memory is full, its contents are replaced by new instructions or data as they are fetched from the primary memory D. A variety of cache replacement algorithms are used. The objective of these algorithms is to maximize the probability that the instructions or data needed in the data processing device DPD are found in the cache memory. This probability is known as the cache hit ratio. A higher hit ratio means that a larger percentage of the instructions or data are being found in the cache and do not require access to a slower resident data memory section RDS. The basic idea of using a cache memory can be applied at different points in a computer system in cases where the main memory is not large enough to contain all the programs and their data.

As already indicated above in the discussion of the database DB, data blocks or segments of a program or of data are often called pages and are transferred from the disc memory D to the main memory MM for processing. When other pages are needed they may replace the pages already in the cache memory if the cache memory is full. The automatic movement of a large program or data segment between the main memory MM and the disc memory D, as the processing means PM executes, is managed by a combination of operating system software and control hardware. The whole process of loading and organizing data in the main memory MM is called memory management.

In FIG. 1—1 the data of the database DB can be managed as follows in connection with the page cache memory section PCS. When the processing means for example wants to perform a read access to a particular object OB of the database, it first calculates its page identity. The page identity is basically an identifier that tells the processing means PM the page identification to which the desired data object OB belongs.

For example, if the processing means wants to read access the object OB02-2 or the data object OB32-2 which are part of the data blocks (pages) p02, p32, the processing means PM first calculates the page identity PID=p02, p32 in step S1. This page identity identifies the page when it is still stored in the database DB and when it has already been transferred to the page cache memory section PCS.

As shown in FIG. 1—1, the database DB as well as the page cache memory section PCS are both organized in data blocks consisting of pages. That is, the database DB comprises the data organized in pages and in the page cache memory section also page-like data regions PCSP are provided. The reason is that anyway only pages for data blocks are transferred from the primary memory D to the secondary memory MM even when only a small data object OB is required.

A typical size of a data object OB is 4 kbytes or 8 kbytes. A page is thus a logical construction of one block on the disc. A typical access time for finding a page on disc is 8 ms whereas only a quarter of a microsecond is necessary for accessing data stored in the main memory MM. Therefore, the time needed for finding the page and transferring the page to the page cache memory section PCS is an important factor that reduces the access time to an individual data object.

When the page identity p02, p32 has been determined in step S1, the next step is to make a lookup in a data structure called the hash-table HT to identify where the desired pages are currently stored in the main memory, more precisely in the page cache section PCS. Two scenarios can happen, i.e. either the page is already stored in the page cache memory section or the relevant page has not been stored in the page cache memory section. If the page that contains the desired data object has already been stored, e.g. if the page P02 containing the desired object OB02-2 has already been stored in the page cache memory,then it is only necessary to read out in step S2 the address location AD-P02 of the relevant page P02 from the hash-table HT. In step S3 the processing means PM gives a read-access request to the main memory to read out the data object from the page P02 at the particular memory location AD-P02.

Similarly, if the page has not been stored in the page cache memory section PCS, then the processing means PM first calculates the relevant page p32, a load request for loading the relevant page P32 from the database DB is given in step S1; and then the steps S2, S3 are repeated with the relevant address AD-P32 of the page where the desired object OB32-2 to be read resides. The data structure used for determining the addresses for the pages is often a hash-ased data-structure as explained above.

As can already be seen from the above description, it is always required that the complete page is stored in the page cache memory section PCS in one of its data regions PCSP, even if only a small data object of a few hundred bytes needs to be read by the processing means PM. Furthermore, it should be noted that the page cache memory PCS is only a comparably small memory and that it will have to be updated with new data from the database after some time. In connection with the hash-table access it is also possible to specify the data regions PCSP which are overwritten first, e.g. before other data regions PCSP are overwritten when new data is loaded from the database DB. Thus, a kind of hierarchy regarding the loading and overwriting of data in the page cache memory section PCS is possible.

Furthermore, in a particular point in time, pages p10, p01, p02, p32, p00, p22 may have been stored in the page cache as shown in FIG. 1—1, however, frequent read accesses have only been performed to the pages p02, p00 (this is indicated with a hatching from the left bottom corner to the right top corner in FIG. 1—1) whilst pages p01, p22 have only been accessed moderately (indicated with a hatching from the top left corner to the right bottom corner in FIG. 1—1). The page p10 (having no hatching) has not been accessed very frequently. Hereinafter, a page data region PCSP that has been accessed frequently is also called a "hot" page. Likewise, a page data region PCSP that is not accessed frequently is also called a "cold" page. Pages having read accesses therebetween are called "warm" pages. As can be seen from FIG. 1—1, due to the fact that always complete pages need to be stored in the page cache, a lot of memory space is occupied in the page cache memory section PCS even though the pages themselves have different read access frequencies because individual data objects can only be accessed by first storing the complete page in the page cache.

However, most data base systems DBS do not have the possibility to move an object from one page to another page. The reason is that the page identity PID is a part of the references to the data object and this reference could either be parts of the external references or part of references from so called indexes. Therefore, collecting data objects from "hot" pages on the new page requires that all references of the (only temporarily available) page structure in the page cache memory PCS need to be updated. This requires time and is unpractical.

Most databases DBS have the original data stored as pages on a disc memory and the main memory MM contains a page cache memory PCS which is overwritten with new data from the database DB at specific times when access is required to a particular data object. However, the processing means PM, of course, does not only perform read accesses to the pages in the page cache but also processes data objects and thus updates data on the data objects. For example, if a data object relates to the address of a customer, if the address of the customer changes, then the processing means PM accesses this data object and changes the address specification and then stores the data object again on its page in the page cache PCS. Thus, data on page cache memory pages can be newer than on the disc memory D. Therefore, main memory pages need to be sent back to the disc memory D at times. Usually, a log ensures that updates not on disc are not lost.

Whilst in FIG. 1—1 only temporarily a number of pages, not all pages of the database DB, have been stored in the page cache section PCS, some particular kind of main memory data base as shown in FIG. 1–2 has all the data stored in the page cache memory PCS. Such type of databases are called main memory data bases and, of course, require an immense memory space in the page cache memory PCS. Whilst this reduces the access time since it is not necessary first to locate the page in the database DB and to retrieve this page into the page cache memory PCS, the memory requirements are very extensive in case of large databases DB.

As shown in FIG. 1—1, it is also possible that the secondary memory MM contains a first (page cache) memory PCS but also a second (resident data) memory section RDS. Some new types of database systems DBS have data which reside always in the resident data memory section RDS with data only occasionally stored in the page cache memory section. For example, as indicated in FIG. 1—1, data objects OB01-1, OB10-1, OB22-1, OB32-2 are resident in the resident data memory section RDS (which is also organized as page datablock RDSP) and other parts of the database DB may be stored as pages in the page cache memory PCS. It is even possible that a part of a page or record always resides in the resident data memory section RDS and other parts of the page or record only reside occasionally in the page cache memory section PCS. Of course, as indicated in FIG. 1—1, there must be references REF01, REF22, REF32 between these parts. This provides the possibility to easily move data that resides occasionally in the page cache, i.e. pages which are not used so frequently ("cold" pages) back to the database DB and only parts of the page, i.e. the object OB22-1 is kept in the resident data memory section RDS. Of course, in this case all references must be made to the resident data memory section and this means that it becomes easy to move the disc-data.

SUMMARY OF THE INVENTION

As explained above, there are different types of databases DBS which only use a page cache memory section PCS or a page cache memory section PCS together with a resident data memory section RDS in the main memory MM for accessing data objects. In the page cache memory section PCS as well as in the resident memory section RDS there are always page data regions PCSP, RDSP which will be overwritten with data earlier than other in datablock PCSP, RDSP. However, independently as to how "cold" or "hot" the pages are, there is always the necessity to store complete pages in the page cache memory section PCS and establish references REF to data objects residing in the resident data memory section RDS (note that in FIG. 1—1 the arrows between PCS and RDS do not indicate a moving of objects but the establishment of references).

Considering the fact that pages are therefore stored in the page cache which are not used frequently and that data objects of a single page may even have individually different read access frequencies, the memory management as explained above is very inefficient regarding the memory requirements and the memory usage. That is, data is stored and retrieved which is actually only used very infrequently.

Therefore, the present invention aims to circumvent the above described disadvantages. In particular, the object of the present invention is to provide a storing method and a data processing device such that a memory management with an efficient usage of the available memory space in the secondary memory is possible.

This object is solved by a method for storing data read from a primary memory device in a secondary memory device for a read/write access by a processing means, said data in said primary memory device being organized as a plurality of data blocks each consisting of one or more data objects and said data objects being stored at one or more data regions of said secondary memory device, said secondary memory device comprising a plurality of data storage sections each including one or more data regions, comprising the following steps: determining for each data object the access frequency indicating the number of accesses in a unit time interval and; storing data objects whose access frequency falls in a predetermined access frequency range in data regions belonging to the same data storage section.

Furthermore, this object is solved by a data processing device for processing data stored on a primary memory device, said data in said primary memory device being organized as a plurality of data blocks each consisting of one or more data objects, comprising a secondary memory device adapted to store said data objects at one or more data regions, said secondary memory device comprising a plurality of data storage sections each including one or more data regions and a processing means comprising a read/write means adapted to read and write data objects from and to data regions of said secondary memory device; wherein said processing means further comprises: an access frequency determining means adapted to determine for each data object stored in said data regions of said secondary memory device the access frequency indicating the number of accesses performed by said read/write means in a unit time interval; wherein said read/write means is adapted for writing data objects whose determined access frequency falls in a predetermined access frequency range in data regions belonging to the same data storage section.

According to the present invention the read or write or read/write access is determined on a data object level. Therefore, it can be decide when a data object should be moved to a "hotter" data storage region of the secondary memory. Extremely "hot" data objects can thus be moved to an often used data storage section of the secondary memory. Very "hot" data objects can be moved to the main memory for access by the processing means PM and "hot" objects are moved to "hot" pages in the page cache memory. Thus, "hot" data objects can be collected together (in separate pages) in a "hot" memory region and "cold" data does not stay longer in the page cache than needed. It should be noted that this concept is applicable to database systems DBS only using the page cache memory section or using the page cache memory section as well as the resident data section. Therefore, there is not so much wasting of main memory space for not so hot objects. This idea to move objects between pages can ensure that hot objects reside on the same pages and thus less memory is wasted for cold objects.

According to a first aspect of the invention the access frequencies of an access frequency range of an (i+1)-th data storage section are greater than the access frequencies of an i-th data storage section and each access frequency range comprises an upper and an lower access frequency threshold value, wherein a data object of the i-th data storage section is moved from the i-th to the (i+1)-th data storage section when the access frequency of said data object is greater than said upper access frequency threshold value and/or a data object of the (i+1)-th data storage section is moved from the (i+1)-th to the i-th data storage section when the access frequency of said data object is smaller than said lower access frequency threshold value.

By setting predetermined access frequency ranges for each data storage section it can be ensured that data objects are moved between pages belonging to different data storage sections. Thus, data objects of similar "heat" can be collected in the same data storage section.

According to a second aspect of the invention, it is also possible to move data objects from a data region to another data region within the same data storage section. Thus, a finer discretisation of the moving of data objects between data storage sections can be performed, i.e. even within each data storage section the data object whose access frequency increases first has to migrate through the data regions of different access frequency within the same data storage section.

According to a third aspect of the invention said secondary memory device comprises a first memory having a number J of first memory data storage sections and a second memory having a number I of second memory data storage sections, each data storage section having assigned a predetermined access frequency range, wherein said read/write means is adapted to move a data object which is stored in an i-th second memory data storage section and whose access frequency exceeds the corresponding upper access frequency threshold value to the (i+1)-th second memory data storage section or to a first memory data storage section of the first memory and/or to move a data object which is stored in an i-th second memory data storage section and whose access frequency is lower than the corresponding lower access frequency threshold value to the (i−1)-th second memory data storage section or to a first memory data storage section of the first memory. Thus, data objects can not only be moved between data storage sections of a resident data memory section or a page cache memory section but also between the page cache section and the resident data memory section.

According to a fourth aspect the determined access frequency is stored together with the data object in the relevant data region. Thus, each data object carries its own identifier regarding its "heat" when it is moved between data regions or data storage sections.

According to a fifth aspect of the invention the upper access frequency threshold value of an i-th data storage region is larger than the lower access frequency threshold value of the (i+1)-th data storage region such that a hystersis is used when moving the data objects between the i-th and (i+1)-th data storage section. That is, when migrating upwards to the data storage regions a movement from one data storage region to another data storage region is performed earlier—in terms of the read access frequency—than from a higher data region to a lower data storage region.

Further advantageous embodiments and improvements can be taken from the dependent claims. Furthermore, it should be noted that the invention is not restricted to the particular embodiments described hereinafter. That is, the invention also includes embodiments which comprise features which have been described separately in the specification and/or in the claims. Hereinafter, special embodiments which are considered as the best mode of the invention by the inventors at present will be described with reference to the attached drawings.

BRIEF DESCRIPTION OF THE DRAWINGS

FIG. 1-2 shows a conventional main memory database;

FIG. 2 shows a block diagram of a database system DBS according to the invention;

It should be noted that in the drawings the same or similar reference numerals denote the same or similar parts throughout.

PRINCIPLE OF THE INVENTION

As explained above, one of the severest constraints when using the main memory MM is that the complete data of one page is always stored in the page cache memory PCS independent as to whether or not data objects of the particular page are actually needed frequently by the processing means PM. As mentioned, it is desirable to ensure that hot objects are stored in main memory without requiring other non-hot objects to be stored on disc.

The principle idea of the invention is that data which is not frequently accessed, e.g. read, written or read/written by the processing means PM, should not be stored in the page cache PCS or the resident data memory section RDS. The idea is that by calculating the heat of an object it can be decided when a data object should be moved to a hotter part of the data base.

Figure 1:
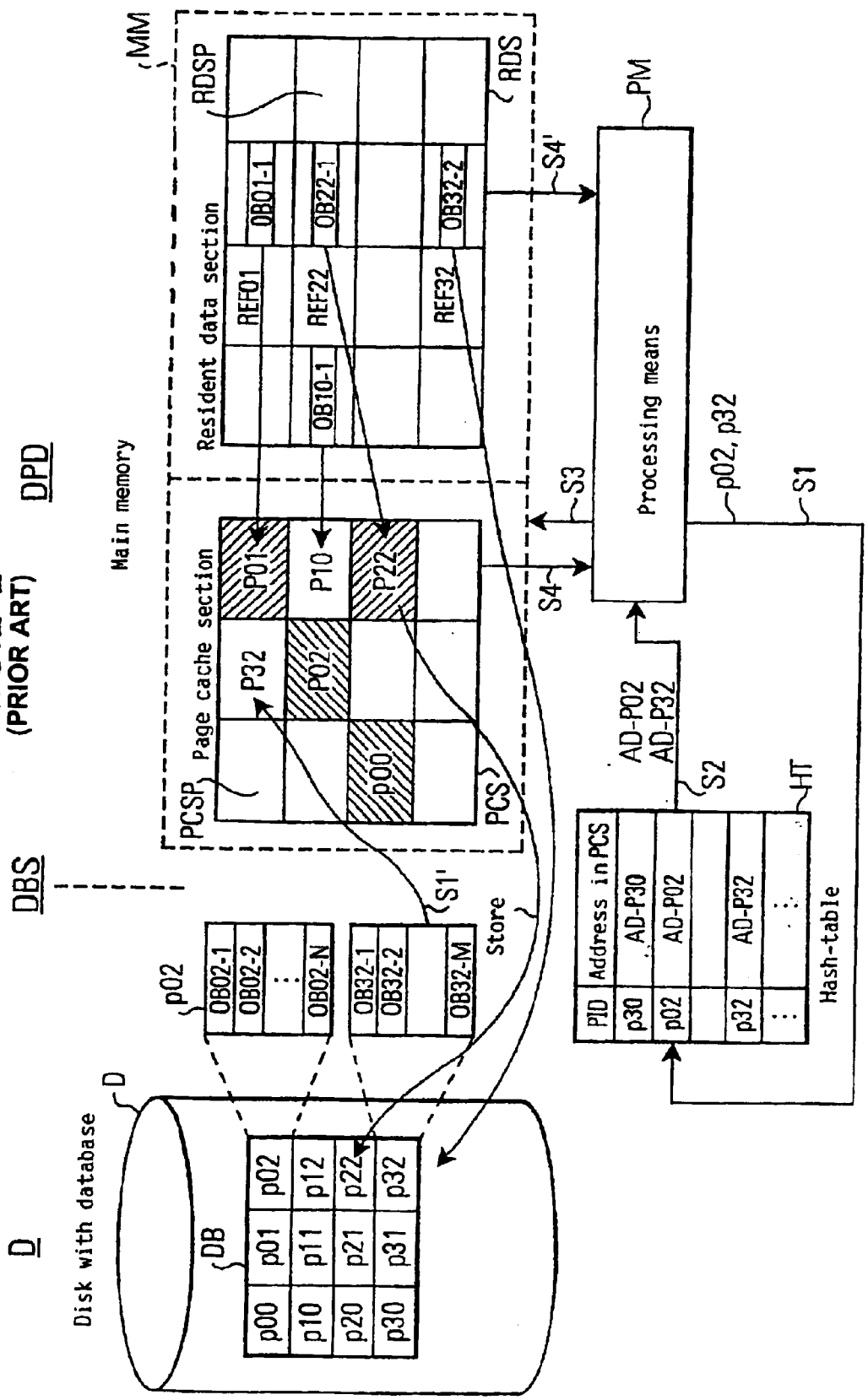
FIG. 1—1 shows a block diagram of conventional database system DBS.
Figures 1, 2:
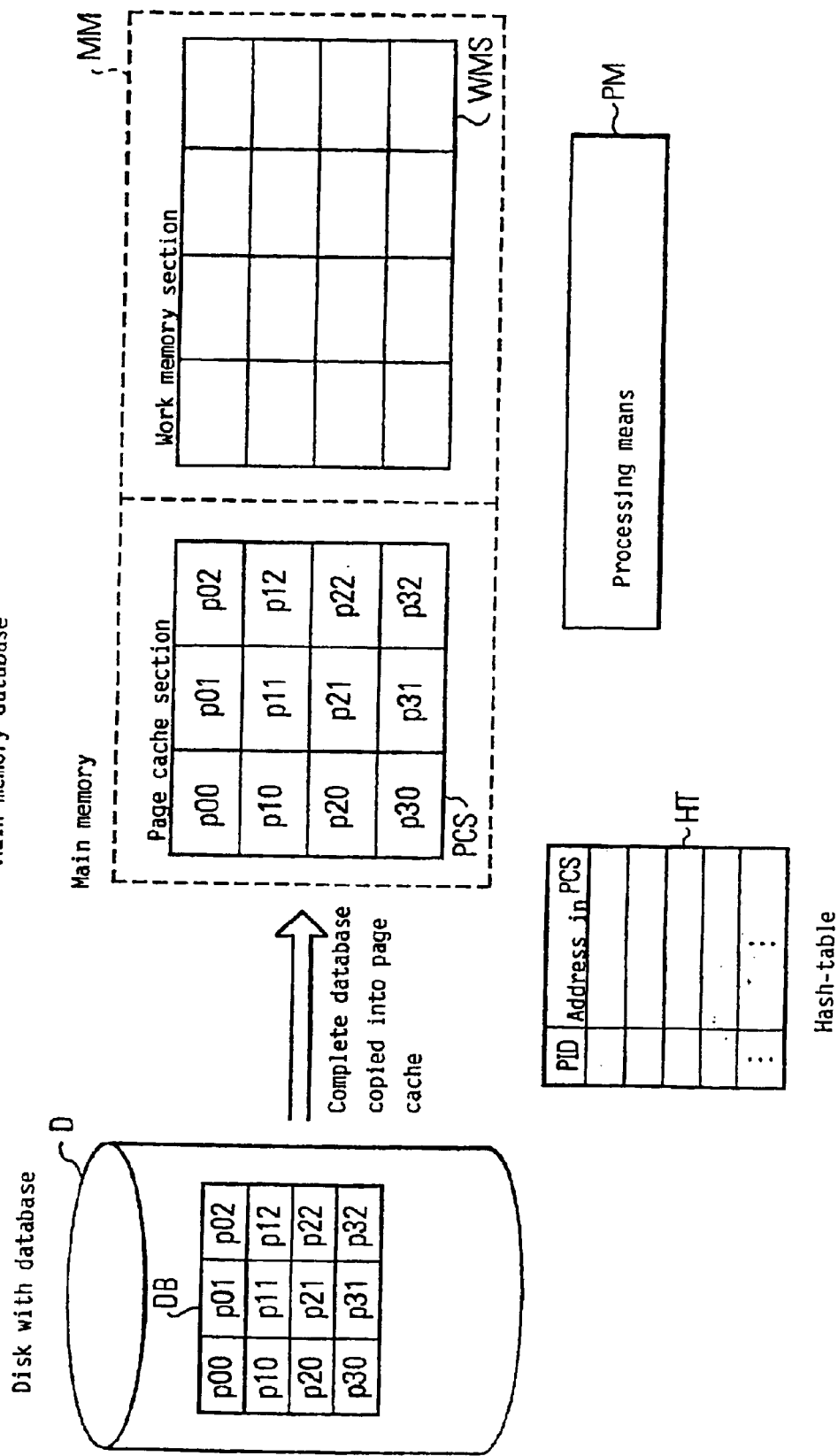
Figure 2:
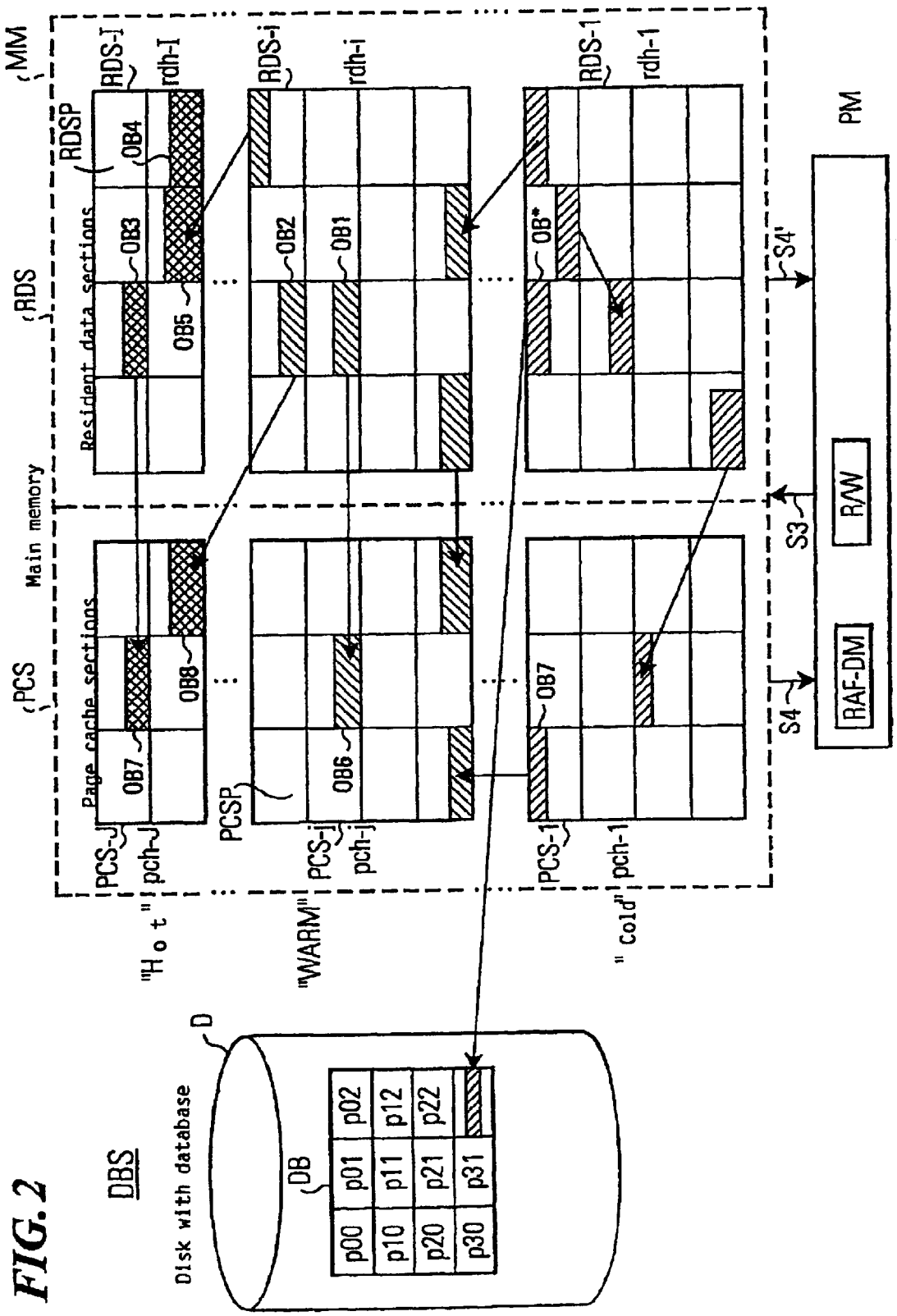

As shown in FIG. 2 a data processing device DPD for processing data stored on a primary memory device D, said data in said primary memory device D being organized as a plurality of data blocks P each consisting of one or more data objects OB, comprises: a secondary memory device MM adapted to store said data objects OB at one or more data regions PCSP; RDSP. Said secondary memory device MM comprises a plurality I, J of data storage sections PCS-1; RDS-1 each including one or more data regions PCSP, RDSP. The processing means PM comprising a read/write means R/W adapted to read and write data objects OB from and to data regions of said said secondary memory device MM. The processing means further comprises: an access frequency determining means RAF-DM adapted to determine for each data object OB stored in said data regions of said secondary memory device MM the access frequency RAF indicating the number of accesses performed by said read/write means R/W in a unit time interval. The read/write means R/W is adapted for writing data objects whose determined access frequency falls in a predetermined access frequency range in data regions belonging to the same data storage section.

In the context of FIG. 2 the primary memory device D is formed by the disc memory including the data base DB, the data stored on the disc memory D is data of the database DB, the datablocks P are pages of said database, the data objects each comprise a plurality of data bytes, and the secondary memory MM is a main memory of the data processor.

As was explained with reference to FIG. 1—1, there are data bases which do not necessarily use the resident data memory section RDS and the above described principle of the invention can be applied to a main memory MM only comprising the pages cache memory. However, of course the invention as explained above can be used in connection with a main memory MM having a page cache memory PCS and a resident data work memory RDS as shown in FIG. 2.

As shown in FIG. 2 and as explained above, it is easy to provide several data storage sections PCS-1, . . . PCS-j, . . . PCS-J in the page cache section and a plurality of data storage regions RDS-1 . . . , RDS-i, . . . , RDS-I in the resident data memory RDS. The number of page cache sections J and the number of resident data sections I may be the same. However, they may be different. Only for illustration purposes the size of the respective data storage sections PCS-j and RDS-i is shown to be the same or may be different. And only for illustration purposes the size of the respective data storage sections PCS-j and RDS-i is shown to be the same.

Assigning a predetermined "heat level" to each data storage section essentially means assigning to each data storage section a predetermined access frequency range pch-1, . . . pch-j . . . , pch-J; rdh-1, . . . rdh-i, . . . rdh-I (pch: page cache heat; rdh: resident data heat). In the simplest case, as shown in FIG. 2, the predetermined read access frequency range may only be a single value.

According to the invention each data object OB stored in the main memory MM (shown with the hatching in FIG. 2) is evaluated regarding its access frequency by the processing means PM. It should be noted that really the read access is the determining factor since even when writing to an object stored in the database this will first require the loading of the page into the main memory MM and the subsequent retrieving of the data object into the processing means PM, the updating of the data object and only then the re-writing of the data object to its respective page in the main memory MM. However, depending on the application, of course, also the read access frequency or the combined read/write access frequency (i.e. the total number of accesses) can be used. Therefore, the read access frequency determination is only one preferred embodiment of the invention.

The determination of the access frequency can be done by providing a time stamp on each page. This time stamp is updated for every x:th access (x=100 as an example). When the time stamp is updated the access counters for each object are updated. That is, the access frequency determining means RAF-DM counts (by means of access counters) the number of access operations (read, write or read/write) performed in a unit time interval (time stamp). This can be done periodically or at time intervals prespecified by the processing means PM. However, in any case the access frequency or the "heat" of an individual object OB will be determined after the expiry of each unit time interval with the determination of the number of accesses in this unit time interval. Whenever a read, write or read/write access is performed to the particular object, the access count number is updated and thus the frequency of access in the unit time interval can be determined. Thus, for each data object the "heat" or access frequency since the last update of the time stamp can be calculated. Preferably, the access frequency is stored together with the data object in the respective data region of the data storage section.

As can be understood from the above explanations, calculating the access frequency for each object enables the read/write means R/W to write or to collect data objects whose determined access frequency fall in a predetermined read access frequency range in data regions belonging to the same data storage section.

As shown in FIG. 2, each data storage section PCS-j, RDS-i, comprise a number of data regions PCSP, RDSP. If the "heat" increases with higher order data storage sections, as indicated in FIG. 2, it is therefore possible to collect objects OB4, OB5 of similar heat rdh-I in the hottest main memory region. Thus, the invention allows the advantage that hot data can be collected together and cold data does not stay longer in the main memory, e.g. in the page cache memory PCS, then actually needed.

For example in the page cache memory PCS a hierarchy of overwriting data regions (pages) can be assigned such that the lower order data regions, e.g. of data storage section PCS-1, are the first ones which are overwritten when new page data is retrieved from the data base. That is, "hotter" regions (regions having a higher read/write access frequency value or range) are less likely to be overwritten. Therefore, objects OB7, OB8 will be the last ones to be overwritten when new page data is retrieved from the data base. Since these objects OB7, OB8 reside in the data storage section PCS-J they also have the highest read/write access frequencies and therefore it is justified to keep them as long as possible in the main memory MM. This likewise applies to the objects OB4, OB5 in the resident data memory section RDS-I.

Although in FIG. 2 it is only shown that a single data object OB resides in a single page PCSP, RDSP, it can also be provided that the total heat for two or for more objects stored in the same page is used for the evaluation as to whether the combination of two or more objects can be moved up to a higher order data storage section.

Furthermore, it is also possible to first load the data, of one page only into the resident data memory section, i.e. complete pages into the data regions of the respective data storage sections and only then move the individual data objects into the page cache memory. In this case, the page cache memory is empty at the beginning and will subsequently only contain data objects rather than complete pages. It should be noted that in any case the processing means PM can access any object in the main memory MM as long as it is stored there. By calculating the read/write accesses the total read/write access frequency within a time period can be determined.

The primary advantage of calculating the "heat" via the read/write access frequency on a data object level is that data objects of comparable relevance for the processing means PM can be collected in the same data storage section PCS-j, RDS-i. Thus, the processing means PM can overwrite data regions of data storage sections having a lower rank earlier than data regions of data storage sections having a higher rank. Therefore, the main memory MM is not over duly occupied by data (data objects) that are not frequently used and therefore it is justified—if indeed such data objects are needed—to retrieve them from the disc memory D if required (by retrieving the corresponding page as described with reference to FIG. 1—1).

However, there is also some dynamics in the data processing method (memory management) since not only can the data objects be collected in data storage sections of similar heat, but they can also be kept available for the processing means PM over a longer or shorter period of time since the objects OB can actually be moved between the different data storage sections according to their "heat" (read, write or read/write frequency). Therefore, the main memory MM is predominantly occupied by data which is very relevant to be processed by the processing means M this being preformed on a data object basis and not on a page-basis.

It should also be noted that the above described principle is not restricted to the usage of two different memory sections in the main memory MM (i.e. a page cache memory and a resident data work memory section). That is, even if—as explained above—only the page cache memory is used, different data storage regions only for this single memory can be provided with different heat levels to allow a movement of data objects when their respectively calculated heat changes. Therefore, also in this case it can happen that at a particular point in time a data object becomes very relevant due to its high read/write or read or write access frequency. At another time, the same data object may lose its importance (as indicated by the reduced access frequency) and may actually migrate to a lower order data storage section.

If the main memory MM is provided with the page cache sections as well as the resident data sections, a migration or movement of data objects cannot only take place between data regions of the same memory (page cache or resident data memory) but there is also a cross-movement from one section to another section, as indicated with the movement of the data object OB2 to the data object region OB8 in FIG. 2. Of course, the respective movements will be influenced by the respective access frequency ranges pch-j, rdh-i respectively assigned to the data storage regions in the page cache and the main memory resident data region.

As indicated with the object OB*, it is also possible that a data object which is very "cold" is stored back into the disc memory D (when it has been updated) or that it is simply overwritten with new data due to it's "coldness". Thus, a flexible usage with maximum storage efficiency of the main memory MM becomes possible.

First Embodiment

Figure 3:
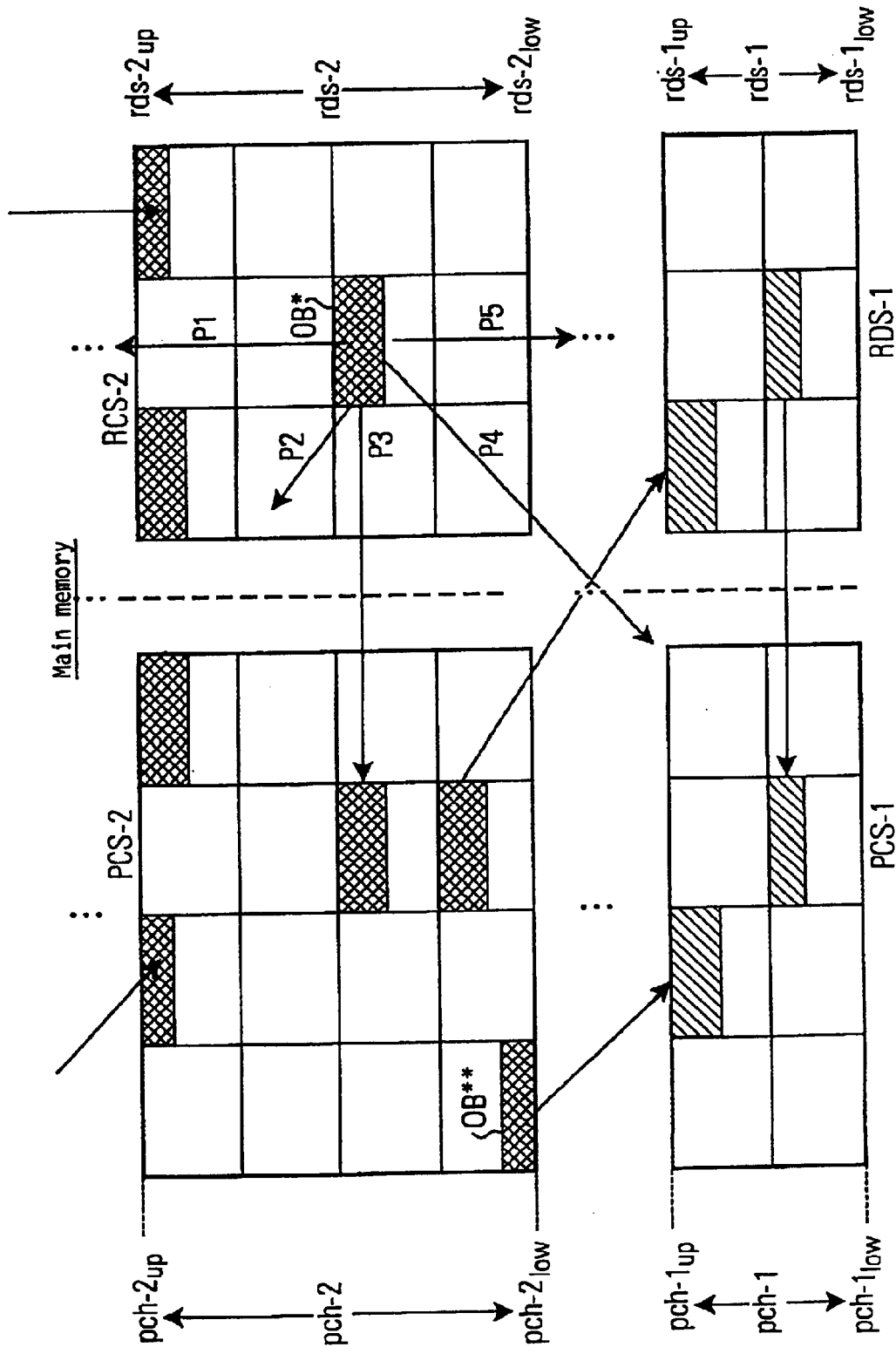
FIG. 3 shows an enlarged view of data regions in FIG. 2.
Figure 4:
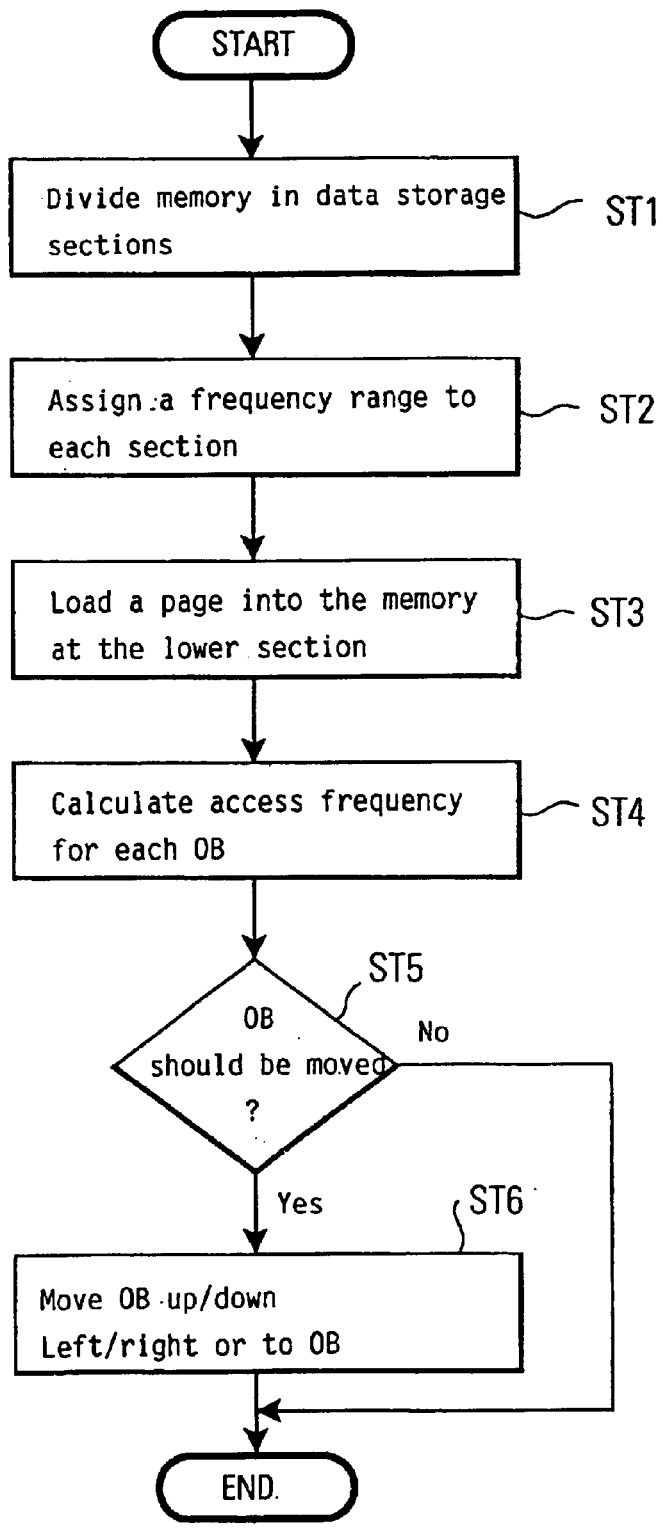
FIG. 4 shows a flow chart of the method according to an embodiment of the invention.

FIG. 3 and FIG. 4 show a first embodiment of the invention when using two different memory sections in the main memory MM, i.e. a page cache memory and a resident data memory. As seen in FIG. 3, each data storage section has preferably assigned to it a predetermined access frequency range pch-1, pch-2; rdh-1, rdh-2. For illustration purposes only two data storage sections are shown. Each access frequency range has an upper and a lower access frequency threshold value pch-$1_{low}$, pch-$1_{up}$, pch-$2_{low}$, pch-$2_{up}$; rdh-$1_{low}$, rdh-$1_{up}$, rdh-$2_{low}$, rdh-$2_{up}$.

In general provisions are made such that the access frequencies of an access frequency range of an (i+1)-th data storage section PCS-i; RDS-i are greater than the read access frequencies of an i-th data storage section and each access frequency range comprises an upper and a lower access frequency threshold value, wherein said read/write means R/W is adapted to move a data object of the i-th data storage section from the i-th to the (i+1)-th data storage section when the access frequency of said data object is greater than said upper access frequency threshold value and/or to move a data object of the (i+1)-th data storage section from the (i+1)-th to the i-th data storage section when the access frequency of said data object is smaller than said lower access frequency threshold value.

As shown in FIG. 4, in step ST1 the main memory MM is divided in two data storage sections in each of the page cache and the resident data portion. In step ST2 the respective access frequency ranges are assigned to each data storage section. Each data storage section can comprise the same number of data regions PCSP, RDSP (for example the size of one page) or can comprise a different number of data regions.

In step ST3 new data is loaded from the data base DB into the main memory MM. When the data is first loaded as one page from the disc memory D, it is not known whether it will contain a "hot" or "cold" data object. Therefore, when data is first loaded into the main memory MM, it is placed at the lower data storage section RDS-1 or PCS-1. Preferably, the data is loaded into the page cache memory "cold section".

In step ST4 the data access frequency value for each object OB is calculated.

In step ST5 the data object access frequency is compared with a respective threshold value contained within each access frequency range. The thresholds can for example be the upper or lower values UP, LOW. Considering a specific data object OB there are five possibilities where it could be moved depending on it's relevance or access frequency.

Firstly, the object OB* can be moved up to the data storage section RDS-3. Furthermore, it can be moved up to the data storage section PCS-3. Furthermore, it can be moved over to the data storage section PCS-2. Furthermore, it can be moved down to the data storage section PCS-1 or it can be moved down to the data storage section RDS-1. This is indicated with possibilities P1, P2, P3, P4, P5 for the object OB* in FIG. 3. If it has been determined in step ST5 (on the basis of comparing respective data object access count with the corresponding threshold) that the object should be moved, then the respective moving of the object takes place in step ST6 depending on the determined access frequency.

Likewise, it is possible that one of the objects, e.g. OB in the page cache section PCS-2 is moved in the corresponding directions P1, P2, P3, P4, P5, i.e. also the data objects OB in a page cache data storage section can be moved to the resident data section and vice versa.

Furthermore, it should be noted that it has been assumed that the complete data storage region in the page cache memory or in the resident data memory of the main memory MM has data regions each corresponding to a same access frequency range indicated with pch-2, pch-1; rds-2, rds-1 in FIG. 3. However, in order to allow a finer discretesation, it is also possible that the data regions themselves are hierachically arranged such that even a movement of a particular data object OB within the same data storage section is possible. For example, if pch-$2_{low}$ corresponds to the lowest data region and pch-$2_{up}$ corresponds to the highest data region, even a movement of the data objects OB within the same storage section is possible depending on the determined access frequency.

Therefore, also in FIG. 3 whenever the object reaches over a certain heat level, then the object is transferred to a higher heat region and when the heat decreases below a certain level the object is moved to a colder region. A hysteresis can be used here. That is, when an object OB in the lower data storage section RDS-1 exceeds it's upper threshold value rds-$1_{up}$ it is moved to the next higher data storage region, e.g. RDS-2. However, the object is only moved back from RDS-2 to RDS-1 when it's access frequency count falls below a value which is lower than rds-$1_{up}$. That is, the upper access frequency threshold of an i-th data storage section RDS-i can be identical to the lower access frequency threshold value of the (i+1)-th data storage region RDS-i or not. Thus, a hysteresis is introduced for the moving of the objects.

Second Embodiment

As described above, according to the invention the main (secondary) memory MM comprises a first (page cache) and a second (resident data) memory. However, a main memory may only consist of one memory. If two memories are provided in the main memory MM as explained and shown in FIG. 2, the data object OB can be moved between data regions of different data sections. In this case, an upward hierarchy of overwriting the memory is used such that data objects which are "hotter" (whose access count is higher) are less frequently overwritten.

Furthermore, according to a second embodiment of the invention, it is not only possible to use a first and second memory section in the main memory MM. That is, the main memory MM may also—horizontally—contain a plurality of sections between which data objects OB can be moved. Each of them can have assigned different access frequency ranges such that horizontally and vertically a priority for the overwriting can be assigned. Again, the same effect as in the first embodiment and in the principle of the invention is obtained, i.e. that data objects OB having a similar access count are stored in data regions belonging to the same data storage section.

Third Embodiment

As explained with reference to FIG. 1—1 and is also shown in FIG. 2, whenever the processing means PM wants to retrieve a data object from a particular page of the disc database DB, it must locate the page where the particular desired data object OB resides on the database DB. Furthermore, when an object is stored back from the page cache section PCSP to the database DB (after possibly being updated with new data at a time when it resided in the main memory) it is indicated with "store" in_FIG. 1—1, the processing means PM must also obtain information as to where (i.e. which page) the (possibly updated) data object stored in the main memory should be stored in the database DB. Therefore, some kind of reference as to where the data object OB resides in the main memory, from where it was retrieved and where it should be stored again, must be maintained by the processing means PM.

Of course, the situation becomes even more complicated, if the data object OB is moved around between different pages in the page cache section and the resident data sections as shown in FIG. 2. Here the original reference as to where the data object was stored in the page cache section or the resident data section has gone completely lost (since the data objects OB are moved around between different page cache sections or resident data sections) unless a reference updating procedure is employed. That is, the data object OB is moved around in the page cache sections and the resident data sections, it will eventually in a corresponding manner also be moved around in the database DB. Therefore, a data object which has for example been stored at page p22 (having a particular reference) may be restored at the data base DB at a different "heat" level, e.g. at the page p02 (having another reference). An example should illustrate this problem.

Objects in a database are usually accessed with some kind of key. That is, where an object is to be retrieved a page number (page reference) and a page index is needed (if objects are organized as disc structure). Users of a database do not normally provided references to objects in memory but rather a logical reference.

Figure 5A:
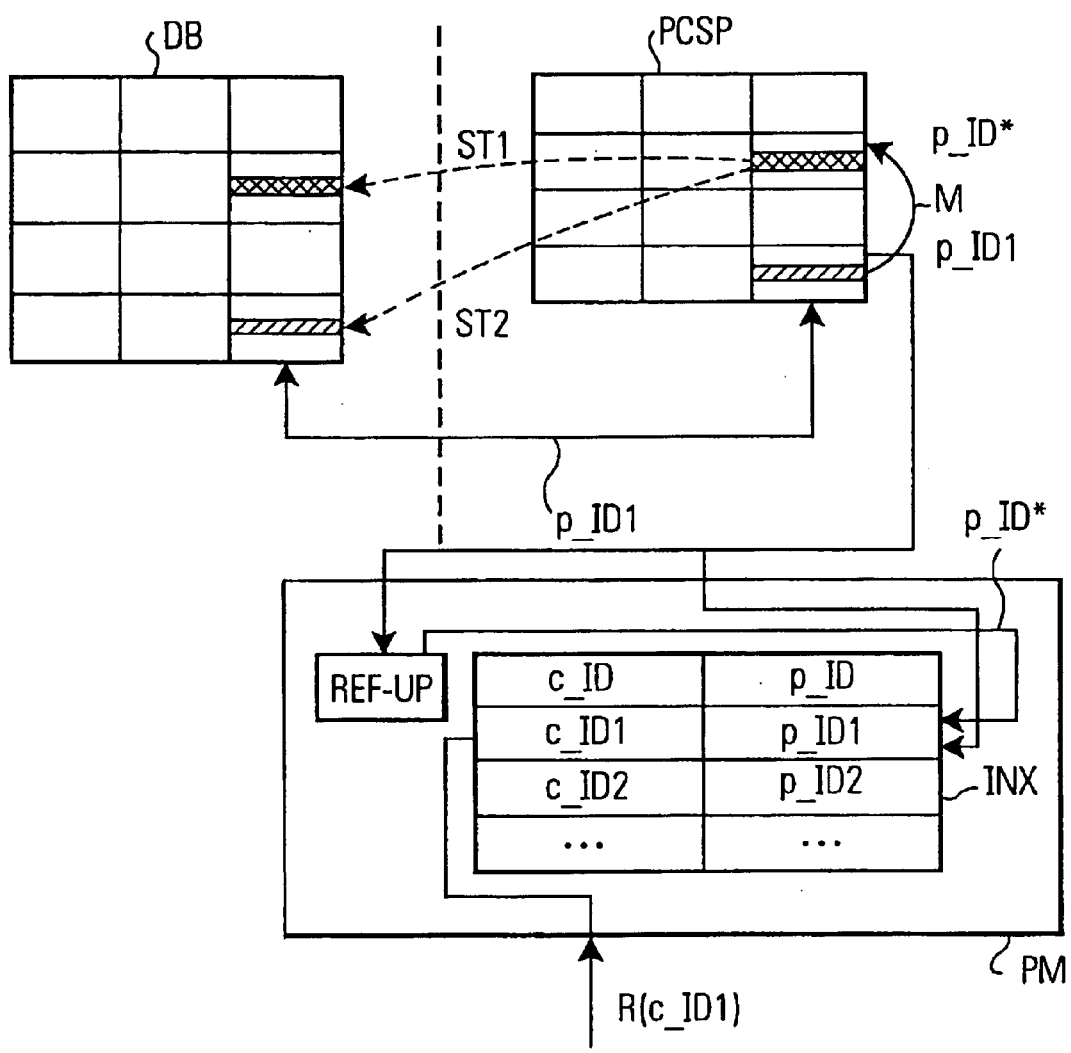
FIG. 5a shows an updating procedure for updating a physical reference to an object using n index structure.

FIG. 5a shows a situation where a user requests access to data belonging to a particular customer. The user inputs a particular so called logical reference "c_ID1", for example a customer identification or a customer name. This is a logical reference key. In the processing means PM, an index INX (i.e. a data structure reference table) must be provided in order to map this logical reference to a physical reference (page reference and page index) pointing to the page section where a data object OB belonging to "c_ID1" may be located. Note that the physical reference $p_{13}$ ID1 can equally refer to the position in the disc database DB or in the main memory sections, for example in the page cache section PCSP.

If, according to the invention, the data object would be moved from p_ID1 to p_ID* (i.e. to a different heat level), e.g. in the page cache section PCSP as indicated with the movement "M", then of course the usage of the physical reference p_ID1 is not correct any longer for locating the respective data object. This becomes even worse if the data object is stored back not at the original position p_ID1 in the disc database DB (see ST2) but at the corresponding page p_ID* in the disc database DB (see ST1). Then the physical location that is assigned to the logical reference in the index structure INX is incorrect, i.e. it does not point to the actual physical location where the moved data object OB is now stored. Therefore, according to the invention, the processing means PM comprises a reference updating means REF-UP that receives the new physical reference p_ID* and updates the corresponding entry in the index structure INX. If now the same user or a further user attempts to access data belonging to the logical reference c_ID1, then the new physical reference p_ID* will be indicated by the index structure INX. That is, when objects move and their physical references change, the index structure INX is updated with the new physical reference such that future users will also find the customer object.

Figure 5B:
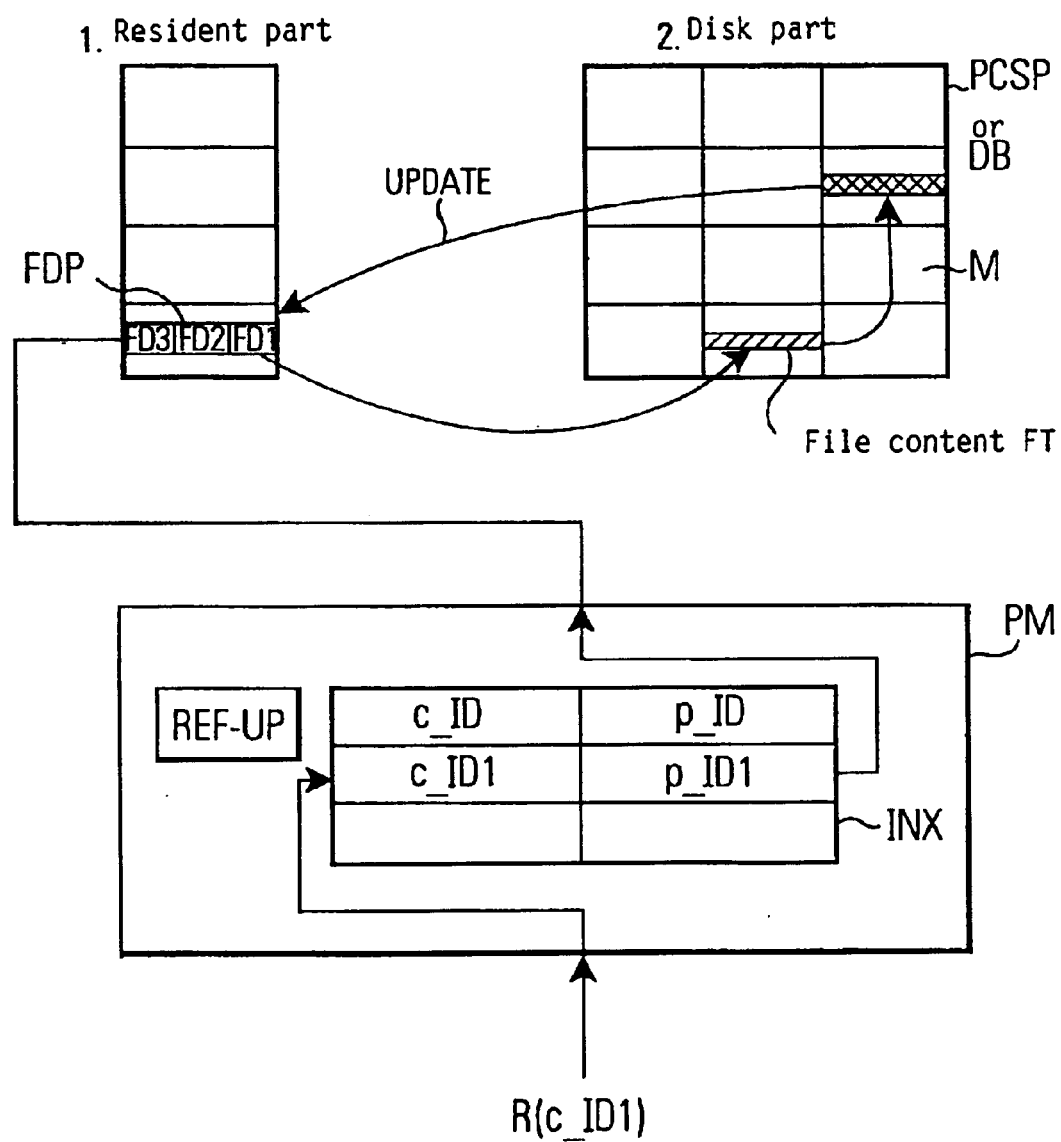
FIG. 5b shows an updating procedure using file description attributes.

Whilst FIG. 5a shows an example where the index structure INX and the record storage is separated, i.e. where the index contains a reference to the record and where this reference is updated when the object is moved, FIG. 5b shows a further example, where the index structure and record structure is combined, i.e. where the record storage is separated into several parts.

As shown in FIG. 5b, the record storage contains a first (resident) part with the file descriptive attributes (each for example 32 bits) in the file descriptive part FDP. The file content, i.e. the data object itself($\approx$10 kB) is stored in the disc part. One of the file descriptive attributes FD1 always points to the respective storage location of the file content in the disc part. When there is a movement of the file content part, i.e. the object, according to the arrow M, then it is this file descriptive part FD1 that is updated with the new location of the file content in the disc part. The first part (resident part) can either be referenced by an index structure INX as illustrated in FIG. 5b or can be part of the index structure INX (i.e. the file descriptive part FDP) located in the right-hand column p_ID of the index structure INX. Alternatively, although not shown in FIG. 5b, another possibility is that the first part FDP (FD1) is directly referenced through a reference in the key, i.e. in the logical reference c_ID1. In all cases the file content can be moved as long as references in the first (resident) part are updated.

Thus, according the third embodiment of the invention, as illustrated in FIGS. 5a, 5b, whenever an object is moved in the main memory according to the access frequency, a reference maintained for this data object is updated. Therefore, the location (i.e. the physical location) can always be traced such that logical references can still be used even when the data object has been moved to a different section in the main memory or in the database section DB.

Furthermore, it should be noted that the resident part FDP can be stored in the resident data section RDS and the file content FT can be stored in the resident data section RDS.

Fourth Embodiment

In the first to third embodiments, it has been described that the data objects are being moved in the page cache section and the resident memory section in accordance with their access frequency, i.e. in accordance with their "heat". In this context, in the first to third embodiments the access frequency is determined in accordance with the "absolute" access frequency of the respective data object.

However, according the fourth embodiment, it is also possible to define the respective access frequency of a data object "relative" to the access frequency of another object. One possibility to realize such a "relative" access frequency determination is by using a doubly linked list and moving objects to the top of the list when they are accessed. For example, a particular page cache section PCS-j in FIG. 2 may have assigned to it a particular range of access frequencies, for example 5 to 10. Obviously, in this region two data objects having an access frequency of for example 6 and 9 may be located in this region. With respect to a third data object residing in the page cache section pch-J having an access frequency of 15, the first and second data object have relative "access frequency distances" of 9 and 6, respectively. Then, the data object that has the closest "access frequency distance" will be moved to the next higher (hotter) page cache section. Thus, the moving of data objects can be made dependent on the relative access frequency. Of course, the associated list must contain the relative access frequency to all data objects respectively residing in the page cache section and/or the resident data section. Furthermore, it should be noted that also the relative access frequency (list) can be stored together with the data in the data object.

INDUSTRIAL APPLICABILITY

As explained above, the present invention is particularly useful when used in connection with a data base system DBS comprising a primary disc memory D on which the data of the data base is stored and a data processing device DPD.

However, the invention can not only be used for retrieving and storing and managing data from a data base. As explained above, a page cache memory is often used for storing instructions used by a processor. Also such kind of instruction storage may be carried out by using the invention. That is, instructions which are more frequently used are moved up to hotter regions of the main memory MM and instructions which are not so frequently used are moved to a lower section of the page cache memory such that they will be overwritten earlier.

The above-described method for storing data and the data processing device regarding the moving of objects based on the "heat" (e.g. access frequency) can advantageously also be applied to caching of objects in clients when using object data bases. The general concept of caching objects in clients is for example described in "an adaptive hybrid server architecture for client caching object DBMSs", pages 150–161 in "Proceedings of the $25^{th}$ VLDB conference, Edinburgh, Scotland, 1999". In such an architecture an object server and a page server are the two competing data-shipping architectures. In data-shipping systems the clients fetch data from the server into their caches and perform some of the database processing locally. Thus, from a scalability standpoint, clients help the server from becoming a bottle-neck by off-loading some of the work. The aforementioned concept according to the invention for storing and moving data objects in memory can equally well be applied to the movement of data or objects in the cache memory of the clients.

It should also be noted that the present invention has great use for storing computer instructions. That is, normally the storage of computer instructions is also page-based and "code" pages are sent to a so called swap file on disc. That is, the primary memory device can be the swap file on disc and the second memory device can be a page cache section whilst the data objects area respectively one or more computer instructions. A single or a set of computer instructions can be moved in accordance with its "access frequency wherein access frequency is the use frequency of the computer instructions. Furthermore, the same handling of moving of data objects can be applied to normal data in an operating system of a computer. Here, sets of the normal data handled by the operating system are the data objects to be stored and moved.

It should also be noted that in computing normally the memory of the processor is referred to as the "primary memory" whilst any additional memory is referred to as "secondary memory". For the convenience of the present application the terminology is reversed, i.e. the processor memory is the "secondary memory" and the additional memory is the "primary memory". However, this is only done here to facilitate the description of the present invention and a skilled person obviously realizes the correct normal use of language in computing.

Furthermore, the skilled person can derive further embodiments, modifications and variations of the invention on the basis of the technical teachings contained herein. In particular, the invention may comprise embodiments which consist of features which have been separately described and/or claimed in the description and/or the claims. Therefore, the scope of protection of the invention should be entirely construed to fall within the scope of the attached claims.

What is claimed is:

1. A method for manipulating data read from a primary memory and storing said data in a secondary memory, said secondary memory being a main memory of a processor and being provided for read/write access by the processor, the data in the primary memory being organized as a plurality of data pages each consisting of one or more data objects, the secondary memory comprising a plurality of at least three data storage sections, each data storage section having one or more data regions for storage of at least one of said data objects, the method comprising the steps of:
   1) determining for each data object an access frequency indicating a number of accesses in a unit time interval; and
   2) storing data objects whose access frequency falls in a predetermined access frequency range in a corresponding data storage section and data region thereof; wherein
      a) the access frequencies of an access frequency range of an (i+1)-th data storage section are greater than the access frequencies of an access frequency range of an i-th data storage section; and
      b) each access frequency range comprises an upper and a lower access frequency threshold value, wherein
         i) a data object of the i-th data storage section is moved from the i-th to the (i+1)-th data storage section when the access frequency of said data object is greater than an upper access frequency threshold value of said i-th data storage section; or
         ii) a data object of the (i+1)-th data storage section is moved from the (i+1)-th to the i-th data storage section when the access frequency of said data object is smaller than a lower access frequency threshold value of said (i+1)-th data storage section.

2. The method of claim 1, wherein said access frequency is stored together with said data object in said data region.

3. The method of claim 1, wherein
said upper access frequency threshold value of the i-th data storage section is identical to said lower access frequency threshold value of the (i+1)-th data storage section.

4. The method of claim 1, wherein
said upper access frequency threshold value of the i-th data storage section is larger than said lower access frequency threshold value of the (i+1)-th data storage section such that a hysteresis is used when moving said data objects between said i-th and said (i+1)-th data storage section.

5. The method of claim 1, wherein
the determined access frequency indicates the number of read accesses, write accesses or read and write accesses to a data object.

6. The method of claim 1, wherein
a physical reference is updated when said data object is moved from one data storage section to another data storage section.

7. The method of claim 6, wherein
said physical reference is updated in an index structure.

8. The method of claim 6, wherein
each data object comprises a first resident part containing one or more attributes and a second movable file content part, and wherein a physical reference contained in one of the attributes is updated when said file content of said data object is moved.

9. The method of claim 8, wherein
said first resident part is located on said primary memory and said second movable file content part is located in said secondary memory.

10. A data processor for processing data stored on an external primary memory, the data in said primary memory being organized as a plurality of data pages each consisting of one or more data objects, said data processor comprising:
   an internal secondary memory being a main memory of the processor, said secondary memory comprising a plurality of at least three data storage sections, each data storage section having one or more data regions for storage of data objects; and
   a means for processing data, comprising:
      (a) a read/write unit adapted to read and write data objects from and to one of said data storage sections of said secondary memory; and
      (b) an access frequency determining unit adapted to determine for each data object stored in said data storage sections of said secondary memory an access frequency indicating the number of accesses performed by said read/write unit in a unit time interval; wherein
         1. said read/write unit is adapted for writing data objects whose determined access frequency falls in a predetermined access frequency range in one or more data regions belonging to a corresponding data storage section, and to update data objects according to their access frequency, wherein
         2. the access frequencies of an access frequency range of an (i+1)-th data storage section are greater than the access frequencies of an i-th data storage section; and
         3. each access frequency range is assigned an upper and a lower access frequency threshold value, wherein
            a. said read/write unit is adapted to move a data object of the i-th data storage section from the i-th to the (i+1)-th data storage section when the access frequency of said data object is greater than the upper access frequency threshold value of said i-th data storage section; and b. said read/write unit is adapted to move a data object of the (i+1)-th data storage section from the (i+1)-th to the i-th data storage section when the access frequency of said data object is smaller than the lower access frequency threshold value of said (i+1)-th data storage section.

11. The data processor of claim 10, wherein
in each data storage section each data region has assigned to it a predetermined access frequency of said access frequency range, and wherein said reed/write unit is adapted to move data objects within said data storage section to other data regions of the same data storage section in accordance with said determined access frequency.

12. The data processor of claim 11, wherein
the determined access frequency indicates the number of read accesses, write accesses or read and write accesses to a data object.

13. The data processor of claim 10, wherein
said read/write unit is adapted to store said access frequency together with said data object in said data region.

14. The data processor of claim 10, wherein
said primary memory is a disk memory;
said data stored on said disk memory is data of a database;
said data objects each comprise a plurality of data bytes;
a first memory of said main memory is a page cache memory; and
a second memory of said main memory is a resident data work memory.

15. The data processor of claim 14, wherein
one part of the data of a single record of said database is stored in said page cache memory and another part of the data is stored in said resident data work memory.

16. The data processor of claim 10, wherein
said upper access frequency threshold value of the i-th data storage section is identical to said lower access frequency threshold value of the (i+1)-th data storage section.

17. The data processor of claim 10, wherein
said upper access frequency threshold value of the i-th data storage section is larger than said lower access frequency threshold value of the (i+1)-th data storage section such that a hysteresis is used when moving said data objects between said i-th and said (i+1)-th data storage section.

18. A database system, comprising:
a primary memory on which data of the database system is stored; and
a data processor for processing data stored on the primary memory, the data in said primary memory being organized as a plurality of data blocks each consisting of one or more data objects, said data processor comprising:
  a secondary memory being a main memory of the data processor, said secondary memory comprising a plurality of three or more data storage sections, each said data storage section having one or more data regions adapted to store at least one data object therein;
  a read/write unit adapted to read and write data objects from and to the one or more data regions of said secondary memory; and
  an access frequency determining unit adapted to determine for each data object stored in one or more data regions of said secondary memory an access frequency indicating the number of accesses performed by said read/write unit in a unit time interval; wherein
  1. said read/write unit is adapted for writing data objects whose determined access frequency falls in a predetermined access frequency range in the one or more data regions belonging to the same data storage section, and to update data objects according to their access frequency, wherein
  2. the access frequencies of an access frequency range of an (i+1)-th data storage section are greater than the access frequencies of an i-th data storage section; and
  3. each access frequency range is assigned an upper and a lower access frequency threshold value, wherein
    a. said read/write unit is adapted to move a data object of the i-th data storage section from the i-th to the (i+1)-th data storage section when the access frequency of said data object is greater than the upper access frequency threshold value of said i-th data storage section; and
    b. said read/write unit is adapted to move a data object of the (i+1)-th data storage section from the (i+1)-th to the i-th data storage section when the access frequency of said data object is smaller than the lower access frequency threshold value of said (i+1)-th data storage section.

19. The database system of claim 18, wherein
in each data storage section each data region has assigned to it a predetermined access frequency of said access frequency range, and wherein said read/write unit is adapted to move data objects within said data storage section to other data regions of the same data storage section in accordance with said determined access frequency.

20. The database system of claim 19, wherein
the determined access frequency indicates the number of read accesses, write accesses or read and write accesses to a data object.

21. The database system of claim 18, wherein
said read/write unit is adapted to store said access frequency together with said data object in said data region.

22. The database system of claim 21, wherein
one part of the data of a single record of said database is stored in a page cache memory and another part of the data is stored in a resident data work memory.

23. The database system of claim 18, wherein
said upper access frequency threshold value of the i-th data storage section is identical to said lower access frequency threshold value of the (i+1)-th data storage section.

24. The database system of claim 18, wherein
said upper access frequency threshold value of the i-th data storage section is larger than said lower access frequency threshold value of the (i+1)-th data storage section such that a hysteresis is used when moving said data objects between said i-th and said (i+1)-th data storage section.

* * * * *